United States Patent
Korenek, Jr.

(10) Patent No.: US 6,527,408 B1
(45) Date of Patent: Mar. 4, 2003

(54) MOTION ACTUATED LIGHT DEVICE

(76) Inventor: Ronald R. Korenek, Jr., 243 Kohutek Rd., Victoria, TX (US) 77904

( * ) Notice: Subject to any disclaimer, the term of this patent is extended or adjusted under 35 U.S.C. 154(b) by 0 days.

(21) Appl. No.: 09/547,181

(22) Filed: Apr. 11, 2000

(51) Int. Cl.⁷ .................................................. F21L 4/02
(52) U.S. Cl. ........................ 362/184; 362/802; 362/800; 362/394
(58) Field of Search ................................ 362/184, 186, 362/194, 195, 196, 197, 198, 203, 240, 253, 276, 394, 469, 800, 802

(56) References Cited

U.S. PATENT DOCUMENTS 4,176,390 A * 11/1979 Galbert ........................ 362/473
5,134,552 A * 7/1992 Call et al. .................... 362/203
6,070,997 A * 6/2000 Duke et al. .................. 362/500

* cited by examiner

Primary Examiner—Sandra O'Shea
Assistant Examiner—Ali Alavi
(74) Attorney, Agent, or Firm—Kenneth H. Johnson

(57) ABSTRACT

The present device is a motion actuated, battery operated LED in which the battery is suspended between two springs in the at rest or off position in which one lead of the LED is connected to negative terminal of the battery through one spring and the other spring is insulated from electrical contact. The second spring's purpose is to position the battery. A second LED lead is provided in close proximity to the positive terminal of the battery such that a force applied to the device and hence to the battery will impart motion to the battery and deform the second spring allowing the positive terminal to contact the second LED terminal thus completing the circuit and lighting the diode.

16 Claims, 3 Drawing Sheets

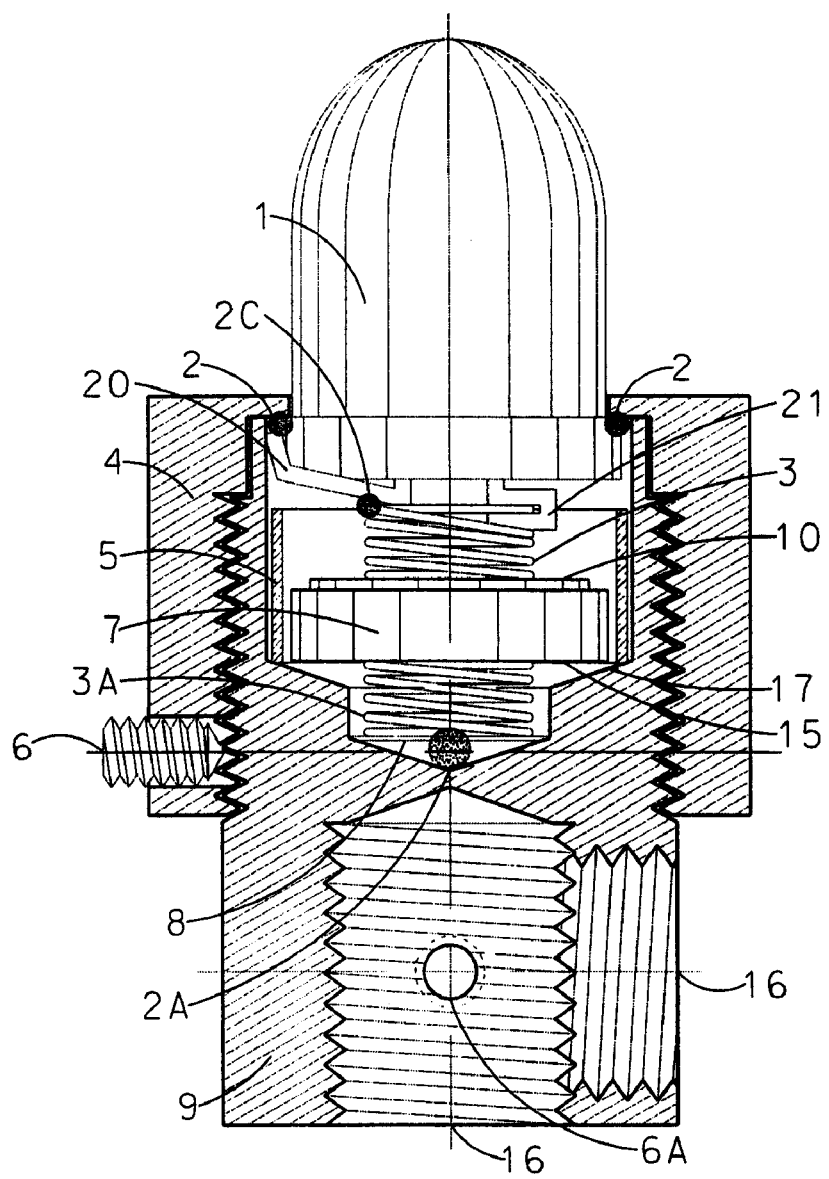
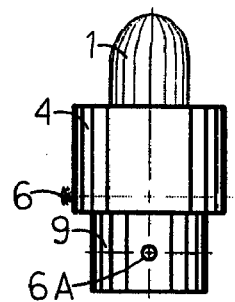

MOTION ACTUATED LIGHT DEVICE

BACKGROUND OF THE INVENTION

1. Field of the Invention

The present invention relates to a motion actuated, battery powered light.

2. Related Information

Most light devices are operated by a switch. The present device in one embodiment for stem valve attachment is useful for motorcycle safety and automobile customization. There are at least two types of valve stem lights; all are marketed toward bicyclists. One type is turned off and on by a switch. It also contains a small light emitting diode, (LED), for the light source; has a plastic body and is powered by a small battery. The other type of valve stem light is also has a plastic body, a small LED, a switch, and a small battery.

It is an advantage of the present invention that it is not necessary that a switch be actuated for the light to operate, i.e. shine or glow.

SUMMARY OF THE INVENTION

Briefly, the invention is an LED device comprising: a body; a battery having a positive and a negative terminal on opposite sides, said battery being positioned by: a first spring on a first of said terminals and a second spring on a second of said terminals; a first LED electrical connection through said first spring to said first terminal, said second spring being insulated from electrical contact; and a second LED electrical contact positioned adjacent to said second terminal of said battery whereby a sufficient motive force applied to said battery deforms said second spring and brings the second terminal into electrical contact with said second LED electrical contact.

Motion may be imparted to the battery by an intermittent force such as shaking the device or continuous motion, such as centrifugal force resulting from moving the device rapidly about an axis.

BRIEF DESCRIPTION OF THE DRAWINGS

FIG. 3 is a cross sectional side elevation view of a completely assembled single LED device.

FIG. 4 is an isometric view of a completely assembled single light device.

PREFERRED EMBODIMENTS

A preferred device comprises of a battery which is resting at equilibrium between two springs. Once the device experiences motive force, the battery moves to a contact and completes the circuit. When the force stops, the battery breaks contact and resumes its position at equilibrium. The top caps of the device consists of an Ultra Bright LED that is connected with adhesive. The LED's come in the colors red, green, blue, amber, and yellow. They can be dyed to make different colors. The device can be mounted on any standard valve stem from the device's bottom or side.

In the following description of the drawings, the same components have been given the same designation in some figures.

Figure 1:
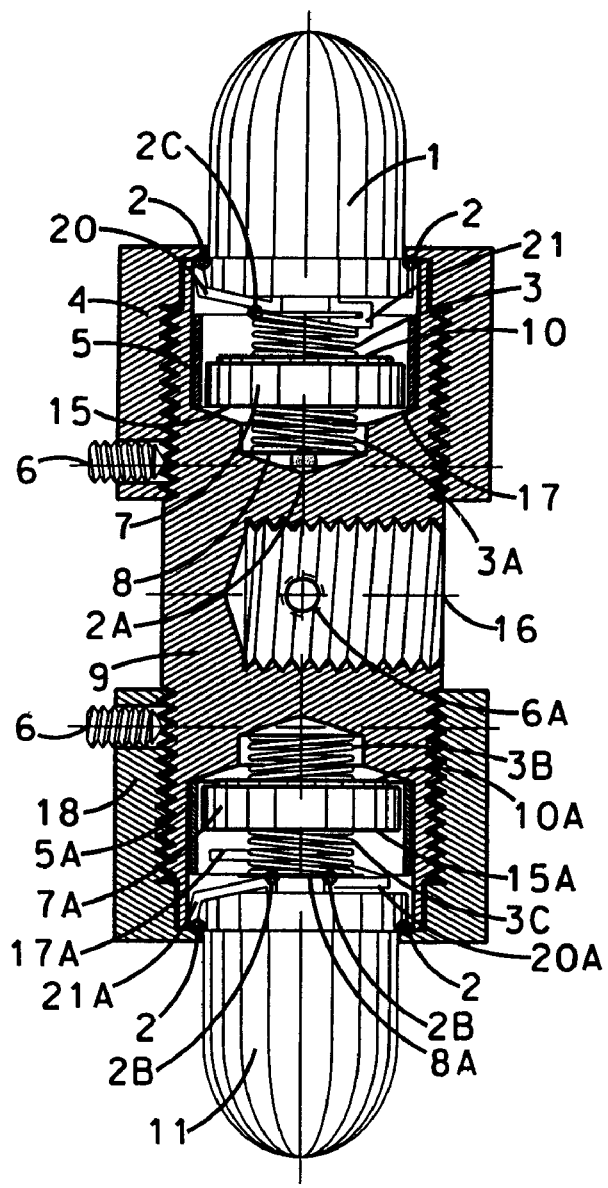
FIG. 1 is a cross sectional side elevation view of a completely assembled double LED device.
Figure 2:
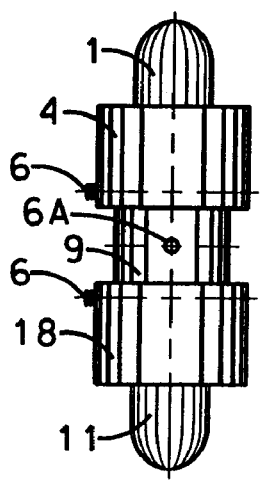
FIG. 2 is an isometric view of a completely assembled device.

Referring now to FIG. 1 and FIG. 2, a typical double light device is shown to comprise of two batteries 7 and 7A, each is separately resting at equilibrium between two springs 3/3A and 3B/3C respectively. Both sets of batteries and the springs are placed within insulating tubes 5 or 5A respectively at opposite ends of the body 9 made of T6 aluminum. The insulating tubes 5 prevents the sides of the battery 7 from making contact with the body 9. The top cap 4 has an Ultra Bright LED 1 product connected thereto with adhesive 2. The positive branch 20 of LED 1 makes constant contact with the body 9 of the motion actuated light, when the top cap is screwed on. The LED's 1 negative branch 21 is clamped onto a spring 3 made of a conducting material. Spring 3 has constant contact with the negative side 10 of the battery 7, and is separated from the positive branch 20 with adhesive 2C. The bottom spring 3A is connected with adhesive 2A to an insulated pad 8, which in turn is connected with adhesive 2A to the body 9. Spring 3A will not conduct electricity. When the motion actuated light experiences movement, centrifugal force, for example, the battery 7 will move, deform spring 3A, and make contact at point 17 with the body 9 thus completing the circuit and turning on the LED 1.

The bottom cap 18 has an Ultra Bright LED 11 connected thereto with adhesive 2. Negative branch 21A of LED 11 makes constant contact with the body 9 when the cap 18 is screwed on. The LED's 11 positive branch 20A is shaped so that it forms around the spring 3C without making contact. An insulating pad 8A is connected to the LED's branches 21A and 20A with adhesive 2B. Spring 3C is then connected to the insulating pad 8A with adhesive 2B. The spring 3C then makes contact with the positive side 15A of the battery 7A. Spring 3C will not conduct electricity. Spring 3B makes contact with the negative side 10A of the battery 7A and the body 9. Spring 3B conducts electricity. When the device experiences movement, such as centrifugal force, the battery 7A will move and the positive side 15A will make contact at point 17A with the positive branch 20A of the LED 11, completing the circuit and turning on the LED 11. Depending on the nature of the force the LED will glow continuously or intermittently. A continuous force, such as the centrifugal force which results from the rotation of the device when adapted to fit on a tire valve stem, will be continuous while the tire rotates, whereas a device attached to bicycle seat or handle bars will light intermittently as the kinetic force from travel surface is transmitted to the bicycle.

Referring next to FIG. 3 and FIG. 4 a typical one light device is shown to comprise one battery 7 which is resting at equilibrium between two springs 3 and 3A. The battery 7 and the springs 3 and 3A are placed within an insulating tube 5 that are placed inside the rim light's body 9. The insulating tube 5 prevents the sides (positive terminal) of the battery 7 from making contact with the body 9. The cap 4 consists of an Ultra Bright LED 1 connected with adhesive 2. The positive branch 20 of the LED makes constant contact with the body 9 of the rim light, when the cap is screwed on. The LED's 1 negative branch 21 is clamped onto a spring 3 made of a conducting material. This spring 3 has constant contact with the negative side of the battery 7, and is separated from the positive branch 20 by adhesive 2C. The bottom spring 3A is connected with adhesive 2A to an insulated pad 8, which in turn is connected to the body 9 with adhesive 2A. Spring 3A will not conduct electricity. When the light experiences centrifugal force, the positive side of the battery 7 will move and make contact at point 17 with the body 9 of the light thus completing the circuit and turning on the LED 1.

Other attributes of the present device are the set screws 6 for the caps. The main purpose of set screw 6 is to deter theft of the rim light's caps. Another set screw 6A secures the body 9 to the valve stem 16. This screw also serves as theft prevention.

Figure 6:
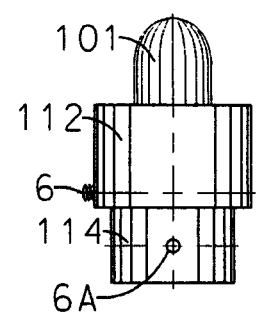
FIG. 6 is an isometric view of a completely assembled plastic device.
Figure 5:
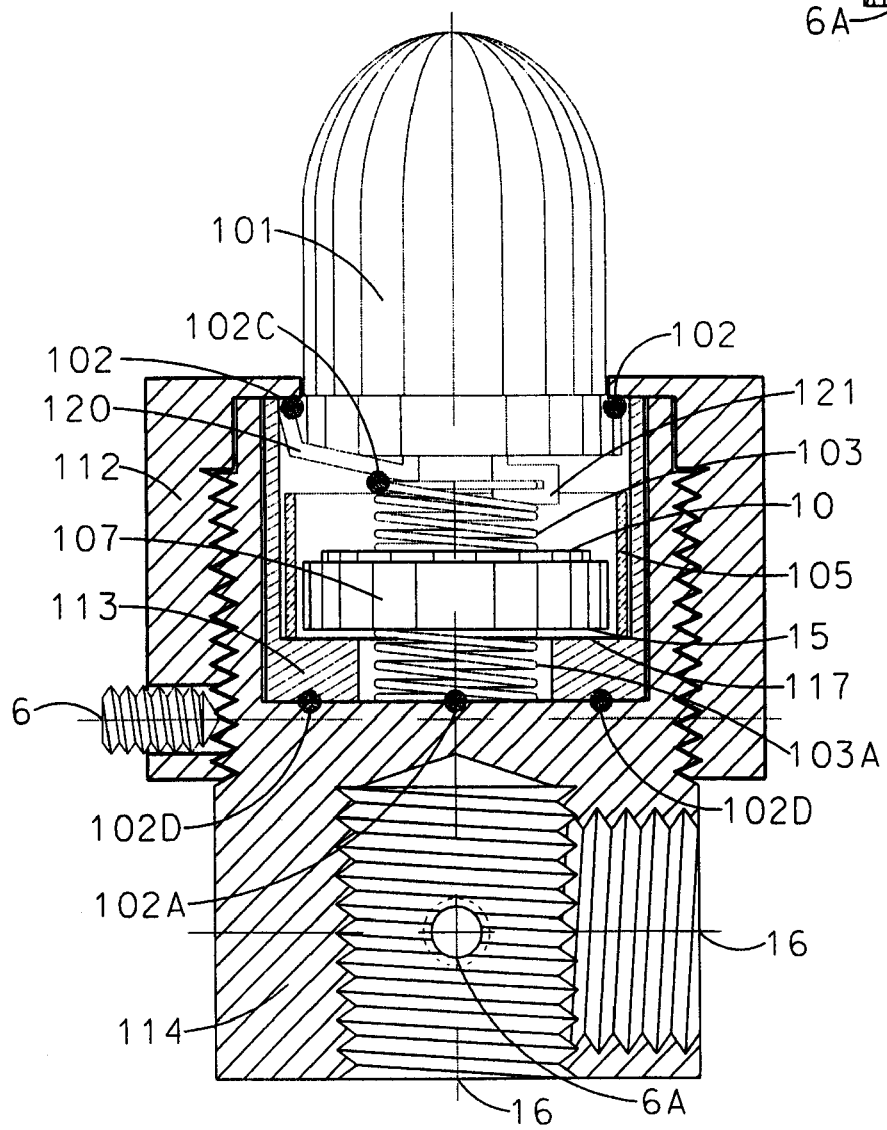
FIG. 5 is a cross sectional side elevation view of a completely assembled plastic device.

Referring next to FIG. 5 and FIG. 6, a plastic device is shown to comprise of one battery 107 which is resting at equilibrium between two springs 103 and 103A. The battery 107 and the springs 103 and 103A are placed within an insulating tube 105 that is placed inside a conducting tube 113 that is attached inside the body 114 with adhesive 102D. The insulating tube 105 prevents the sides of the battery 107 from making contact with the conducting tube 113. The cap 112 consists of an LED 101 connected with adhesive 102. Positive branch 120 of LED 101 makes constant contact with the conducting tube 113, when the cap is screwed on. The LED's 101 negative branch 121 is clamped onto a spring 103 made of a conducting material. This spring 103 has constant contact with the negative side of the battery 107, and is separated from the positive branch 120 by adhesive 102C. The bottom spring 103A is connected with adhesive 102A to the plastic rim light's body 114, this spring will not conduct electricity. When the plastic rim light experiences centrifugal force, the battery 107 will be moved and make contact at point 117 with the conducting tube 113 thus completing the circuit and turning on the LED 101.

The batteries preferred for use are low silhouette, lithium or nickel/cadmium electronic batteries of appropriate voltage.

The sensitivity of all of the device types can be adjusted by their caps. The tighter the cap is the more sensitive the device becomes until it is on constantly.

As can be appreciated that the springs are very sensitive. The force rating of the springs should be just slightly greater than force applied by the weight of the battery. When a motivating force, such as centrifugal force, from a turning bicycle wheel is applied to the battery, the increase in force deforms the spring and allows the circuit to be completed. In the absence of the applied force the battery is positioned and suspended in the body of the device in a neutral or off position by the fact that a completed electrical contact is not made. The force rating of the spring on either side of a battery is the same or substantially the same and the springs are interchangeable.

The springs of the illustrated device were made of a conducting material with the radius of 0.0100 in., with a compressed length of 0.0500 in., and a free length of 0.1500 in. The springs used may differ in configuration, so long as the force exerted on the battery is essentially the same, thereby suspending the battery in the cavity in the body of the device in the off position in the absence of a motivating force on the battery.

The invention claimed is:
1. An LED device comprising:
   a body;
   a threadable bore in said body to engage a tire valve stem;
   a battery having a positive terminal and a negative terminal on opposite sides, said battery being moveably positioned in a cavity in said body by continuous contact with:
      a first spring on said negative terminal and
      a second spring on said positive terminal;
   a first LED electrical contact through said first spring to an electrical contact, said second spring being insulated from electrical contact by an insulated pad positioned between said spring and said battery; and
   a second LED electrical contact, comprising an internal surface of said body cavity, being positioned adjacent to said positive terminal of said battery whereby a sufficient motive force applied to said battery deforms said second spring and brings the positive terminal into electrical contact with said second LED electrical contact.

2. The LED device according to claim 1 wherein said springs have a substantially equal force rating.

3. The LED device according to claim 1 wherein said body is electrically conductive.

4. The LED device according to claim 3 wherein said second LED electrical contact comprises said body.

5. The LED device according to claim 1 wherein said second LED electrical contact comprises a lead.

6. The LED device according to claim 1 wherein said springs comprise helixes.

7. The LED device according to claim 1 wherein said springs comprise coil springs.

8. The LED device according to claim 1 wherein a cap is removably attached to said body.

9. An LED device comprising:
   a body;
   a threadable bore in said body to engage a tire valve stem;
   a battery having a positive terminal and a negative terminal on opposite sides, said battery being moveably positioned in a cavity in said body by continuous contact with:
      a first spring on said negative terminal and
      a second spring on said positive terminal;
   a first LED electrical contact through said first spring to an electrical contact, said second spring being insulated from electrical contact by an insulated Dad positioned between said spring and said battery; and
   a second LED electrical contact being positioned adjacent to said positive terminal of said battery whereby a sufficient motive force applied to said battery deforms said second spring and brings the positive terminal into electrical contact with said second LED electrical contact wherein said body is non conductive and a conductive tube is positioned within said body around said battery and springs, said tube comprising said second LED contact.

10. The LED device according to claim 9 wherein said body is electrically conductive.

11. The LED device according to claim 10 wherein said second LED electrical contact comprises said body.

12. The LED device according to claim 9 wherein said second LED electrical contact comprises a lead.

13. The LED device according to claim 9 wherein said springs comprise helixes.

14. The LED device according to claim 9 wherein said springs comprise coil springs.

15. The LED device according to claim 9 wherein a cap is removably attached to said body.

16. The LED device according to claim 9 wherein said springs have a substantially equal force rating.

* * * * *